US011895475B2

(12) United States Patent
Ito

(10) Patent No.: US 11,895,475 B2
(45) Date of Patent: Feb. 6, 2024

(54) SPEAKER WITH IMPROVED COOLING

(71) Applicant: Alps Alpine Co., LTD, Tokyo (JP)

(72) Inventor: Ryo Ito, Fukushima (JP)

(73) Assignee: Alps Alpine Co., Ltd., Tokyo (JP)

( * ) Notice: Subject to any disclaimer, the term of this patent is extended or adjusted under 35 U.S.C. 154(b) by 25 days.

(21) Appl. No.: 17/706,992

(22) Filed: Mar. 29, 2022

(65) Prior Publication Data

US 2022/0329948 A1 Oct. 13, 2022

(30) Foreign Application Priority Data

Apr. 13, 2021 (JP) ................................. 2021-067564

(51) Int. Cl.

*H04R 9/02* (2006.01)
*H04R 3/00* (2006.01)
*H04R 7/12* (2006.01)
*H04R 7/18* (2006.01)
*H04R 9/06* (2006.01)

(52) U.S. Cl.

CPC ............... *H04R 9/022* (2013.01); *H04R 3/00* (2013.01); *H04R 7/12* (2013.01); *H04R 7/18* (2013.01); *H04R 9/025* (2013.01); *H04R 9/06* (2013.01); *H04R 2400/11* (2013.01)

(58) Field of Classification Search

CPC .......... H04R 9/022; H04R 9/025; H04R 9/06; H04R 9/00; H04R 3/00; H04R 7/12; H04R 7/18; H04R 2400/11; H04R 2217/00; H04R 1/00; H04R 1/28; H04R 1/2807; H04R 29/003; H04R 2209/00; H04R 2209/041

USPC ....... 381/190, 150, 396, 397, 400, 412, 338, 381/339

See application file for complete search history.

(56) References Cited

U.S. PATENT DOCUMENTS

| | | | | |
|---|---|---|---|---|
| 6,243,472 | B1 * | 6/2001 | Bilan | H04R 1/06 381/407 |
| 7,120,270 | B2 | 10/2006 | Aronson et al. | |
| 10,045,461 | B1 | 8/2018 | Boozer | |
| 2006/0285717 | A1 * | 12/2006 | Aronson | H04R 9/022 381/397 |
| 2012/0219171 | A1 * | 8/2012 | Velican | H04R 1/2842 381/345 |
| 2019/0273985 | A1 | 9/2019 | Katz | |

FOREIGN PATENT DOCUMENTS

| | | |
|---|---|---|
| JP | 1-149191 | 10/1989 |
| JP | 2004-120747 | 4/2004 |

OTHER PUBLICATIONS

Extended European Search Report from corresponding European Application No. 22164168.1, dated Sep. 13, 2022, 10 pp.

* cited by examiner

*Primary Examiner* — Ahmad F. Matar
*Assistant Examiner* — Sabrina Diaz
(74) *Attorney, Agent, or Firm* — Crowell & Moring LLP

(57) ABSTRACT

A rear side of a vibration part of a speaker is covered by a cover member, and a duct is provided at the cover member. The cover member has a recessed portion, and an air flow path is formed inside the recessed portion. A circuit part is mounted on an outer surface of the cover member, and a heat sink provided in the air flow path is connected to the circuit part to allow heat conduction. Due to vibration of the vibration part, an airflow in the air flow path is accelerated and thus the effect of dissipating heat from the heat sink is increased.

15 Claims, 8 Drawing Sheets

SPEAKER WITH IMPROVED COOLING

RELATED APPLICATION

The present application claims priority to Japanese Patent Application Number 2021-067564, filed Apr. 13, 2021 the entirety of which is hereby incorporated by reference.

BACKGROUND OF THE INVENTION

1. Field of the Invention

The present invention relates to a speaker, including a circuit part having a heating electronic element, for increasing the heat-dissipation effect of the circuit part.

2. Description of the Related Art

In a speaker described in Japanese Unexamined Utility Model (Registration) Application Publication No. 1-149191, a frame is fixed to an upper portion of a magnetic circuit and a vibration system including a diaphragm and a coil is supported by an edge and a damper so as to vibrate freely inside the frame. A holding member having a large heat-dissipation area is fixed to an upper surface of a center pole of the magnetic circuit and an amplifier is fixed on the holding member. This is a construction that, when the diaphragm vibrates with a large amplitude in a low-frequency band and an air volume is increased above the diaphragm, can increase the heat-dissipation effect and the cooling effect of the amplifier that is exposed to outside air above the diaphragm.

In an acoustic apparatus described in JP 2004-120747 A, a driving-body cone and a driving motor structural body that vibrates the driving-body cone are provided at a frame member. An amplifier assembly is provided at a capacity portion disposed forward of the driving-body cone. The amplifier assembly has a heat sink and an amplifier cover that thermally contacts the heat sink and holds an amplifier. This is also a construction in which, when the driving-body cone vibrates with an audible-range frequency, air motion is produced at the capacity portion due to a pressure wave that becomes a sound wave, and heat is easily dissipated from the amplifier assembly.

In the technologies described in Japanese Unexamined Utility Model (Registration) Application Publication No. 1-149191 and JP 2004-120747 A, when the diaphragm or the driving-body cone has vibrated, an airflow similar to a laminar flow is produced forward of the diaphragm or the driving-body cone, and the airflow similar to a laminar flow only reciprocates back and forth in a wide area. Since the amplifier is merely disposed by being exposed to air existing forward of the diaphragm or the driving-body cone, even if the airflow similar to a laminar flow acts upon the amplifier, air around the amplifier cannot be sufficiently mixed, and thus heat tends to be retained around the amplifier, as a result of which there is a limit to how high the heat-dissipation effect can be made.

SUMMARY

The present disclosure is provided for solving the above-mentioned problems of the related art, and an object of the present disclosure is to provide a speaker that is capable of increasing the heat-dissipation effect of a circuit part.

The present disclosure provides a speaker including a vibration part that includes a diaphragm and a voice coil, a magnetic circuit part that applies a magnetic field to the voice coil, and a supporting body that supports the vibration part and the magnetic circuit part. In the speaker, the supporting body includes a cover member that covers the vibration part from one of vibration directions of the vibration part, and a duct that causes a space between the vibration part and the cover member to communicate with outside space situated outward of the cover member. In addition, an air flow path where an interval between the vibration part and the cover member in the vibration directions is wider than an interval at another part in the space between the vibration part and the cover member is formed, and the air flow path communicates with an inside of the duct. Further, a circuit part provided on an outer side of the cover member and a heat sink that has at least a part thereof exposed in the air flow path are connected to each other to allow heat conduction.

According to the speaker of the present disclosure, it is desirable that the cover member be such that a part of a region thereof that covers the vibration part has a recessed portion recessed in a direction away from the vibration part, and an inside of the recessed portion function as the air flow path.

According to the speaker of the present disclosure, for example, the air flow path is formed continuously around a central axis of the vibration part, and the duct is displaced from the central axis.

Alternatively, according to the speaker of the present disclosure, the duct is displaced from a central axis of the vibration part, and at least a part of the air flow path passes through the central axis.

Alternatively, according to the speaker of the present disclosure, the duct is provided on a central axis of the vibration part, and the air flow path extends toward the central axis from an outer peripheral side of the vibration part.

According to the speaker of the present disclosure, it is desirable that the diaphragm have a tapering portion, and the cover member include a cover tapering portion that faces the tapering portion of the diaphragm and that is inclined in a same direction as the tapering portion of the diaphragm, and that the interval at the air flow path in the vibration directions be wider than an interval between the vibration part and the cover tapering portion in the vibration directions.

According to the speaker of the present disclosure, it is desirable that the heat sink have a groove, and that the groove extend through the heat sink in a direction toward the duct in the air flow path.

According to the speaker of the present disclosure, the circuit part may have a circuit board fixed to an outer surface of the cover member, and an electronic element mounted on the circuit board, and the heat sink may be connected to the circuit part via an opening in the cover member.

The speaker of the present disclosure includes a cover member that covers the diaphragm from one of the vibration directions of the vibration part. Therefore, an air flow path that communicates with the duct is formed in a closed space between the diaphragm and the cover member, and a heat sink is disposed in the air flow path. Since, when the vibration part vibrates, an airflow is produced in the air flow path, heat can be effectively dissipated from the heat sink that is positioned in the air flow path.

DESCRIPTION OF THE PREFERRED EMBODIMENTS

In a first embodiment to a fourth embodiment of the present invention described below, Y1-Y2 directions are vibration directions of a vibration part 2. In each embodiment, the Y1 direction is a sound-producing direction in a forward direction, and the Y2 direction is a rearward direction. A speaker of each embodiment is used for being mounted in a vehicle. In an installation example of the speaker, the forward direction (Y1 direction), which is the sound-producing direction, is toward the inside of a compartment of a vehicle, and a duct 14 provided rearward is fixed to the body of the vehicle so as to communicate with space outside of the vehicle. In another installation example, the speaker is disposed in a space situated outside the compartment of the vehicle, such as an engine compartment or a trunk, and the duct 14 is oriented toward the inside of the compartment of the vehicle. In this case, the Y2 direction becomes the sound-producing direction in the forward direction toward the inside of the compartment of the vehicle, and the Y1 direction becomes the rearward direction toward the outside of the vehicle.

First Embodiment

Figure 1:
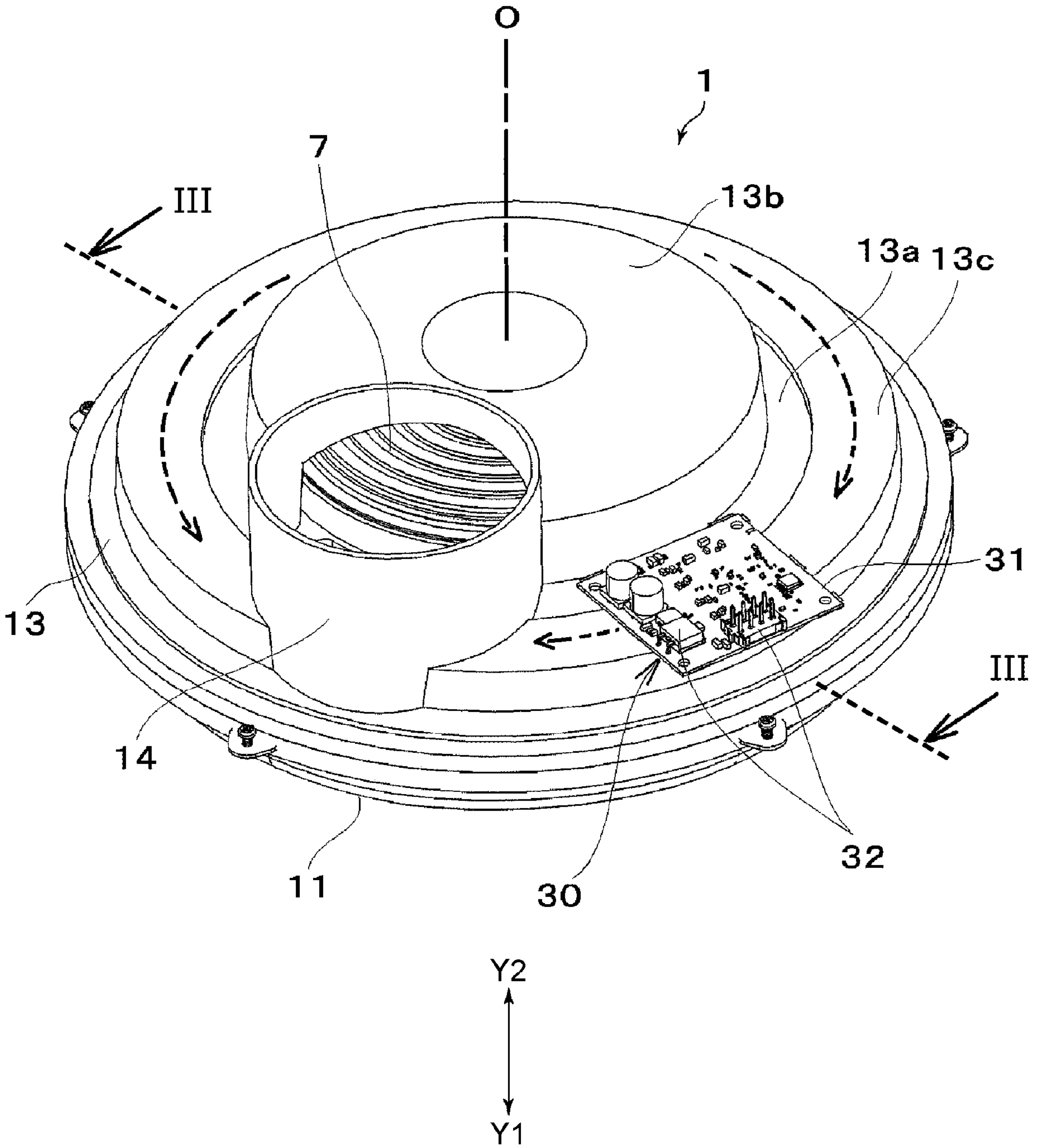
FIG. 1 is an exterior perspective view showing a speaker of a first embodiment of the present invention as seen from the rear.
Figure 2:
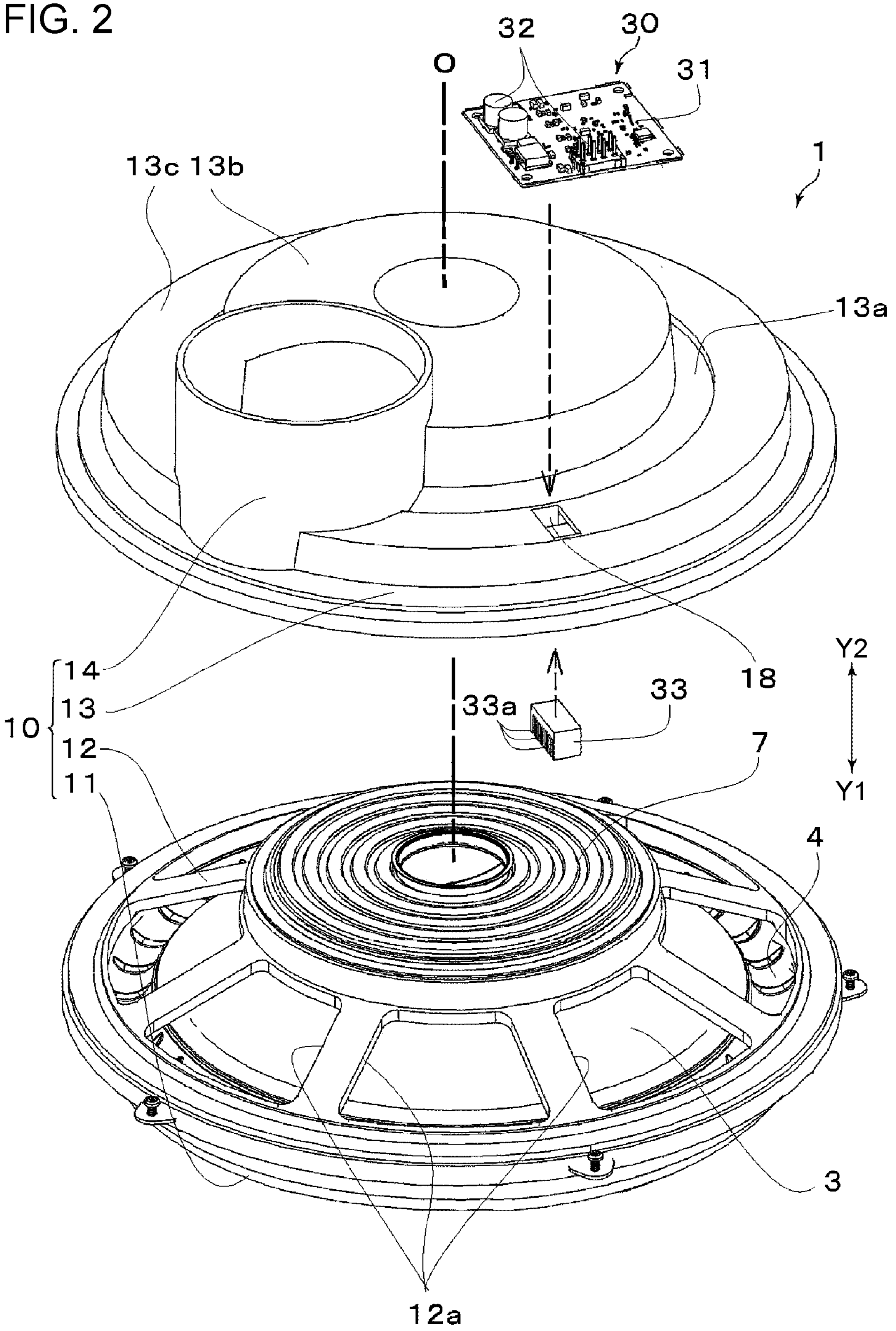
FIG. 2 is an exploded perspective view showing the speaker of the first embodiment as seen from the rear.
Figure 3:
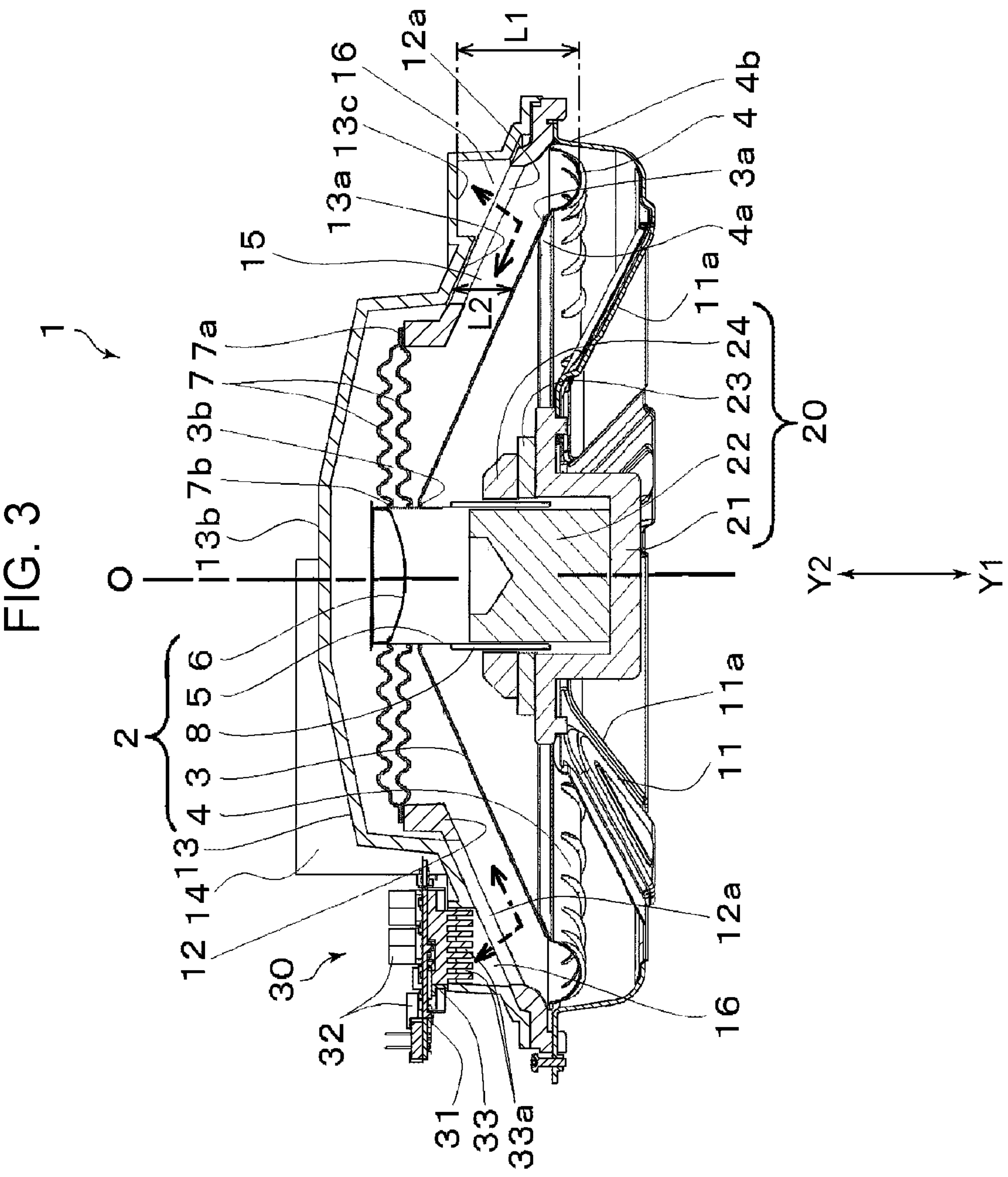
FIG. 3 is a sectional view of the speaker of the first embodiment along line III-III shown in FIG. 1.

In a speaker 1 of the first embodiment of the present invention shown in FIGS. 1 to 3, the illustrated downward direction is the sound-producing direction in the forward direction (Y1 direction), and the illustrated upward direction is the rearward direction (Y2 direction). Even in the second embodiment to the fourth embodiment, which are illustrated in a corresponding one of FIG. 4 and subsequent figures, the illustrated downward direction is the sound-producing direction in the forward direction (Y1 direction), and the illustrated upward direction is the rearward direction (Y2 direction).

The speaker 1 shown in FIGS. 1 to 3 has a supporting body 10. As shown in FIG. 2, the supporting body 10 has a front frame 11 that is positioned on a forward side, a rear frame 12 that is positioned on a rearward side, a cover member 13 that is positioned rearward of the rear frame 12 and that is placed upon the rear frame 12, and a duct 14 provided at the cover member 13. The duct 14 is integrated with the cover member 13. Alternatively, the duct 14 is formed separately from the cover member 13 and is fixed to the cover member 13. A diaphragm 3 is provided inside the speaker 1. The diaphragm 3 is such that its planar shape projected from the front or the rear is a circular shape. The diaphragm 3 has a tapering portion whose diameter gradually increases in the forward direction (Y1 direction), which is the sound-producing direction. The main parts, that is, the front frame 11, the rear frame 12, and the cover member 13 are such that their planar shapes projected from the front or the rear are circular shapes. Note that the diaphragm 3, the front frame 11, the rear frame 12, and the cover member 13 may be such that their planar shapes projected from the front or the rear are elliptical shapes or oval shapes.

As shown in FIG. 3, a plurality of openings **11*a* are formed in the front frame 11, and sound pressure produced by vibration of the diaphragm 3 can be directed forward (Y1 direction) via the openings 11*a*. A plurality of openings 12*a* are also formed in the rear frame 12. The cover member 13 covers, excluding an inside space of the duct 14, the entire region of a space behind the vibration part 2 including the diaphragm 3** so as to close the entire region.

As shown in FIG. 3, the vibration part 2 has the diaphragm 3, an edge member 4, a bobbin 5, and a cap member 6. Each figure showing a corresponding one of the embodiments shows a central axis O extending through the center of the vibration part 2 and extending in a front-rear direction (vibration direction of the vibration part 2). The edge member 4 is made of an elastically deformable sheet material and is formed so that its cross section is curved in a semicircular shape. The edge member 4 is such that its planar shape when viewed from the front or rear is a ring shape, and its inner peripheral portion **4*a* is adhered to an outer peripheral edge 3*a* of the diaphragm 3. An outer peripheral portion 4*b* of the edge member 4 is interposed between an outer peripheral portion of the front frame 11 and an outer peripheral portion of the rear frame 12, and the outer peripheral portion of the front frame 11 and the outer peripheral portion of the rear frame 12 and an outer peripheral portion of the cover member 13 are fixed with, for example, screws. The bobbin 5 is provided on the central axis O of the speaker 1, and an inner peripheral edge 3*b* of the diaphragm 3 is adhered and fixed to an outer peripheral surface of the bobbin 5. A rearwardly (Y2 direction) facing opening of the bobbin 5 is covered by the cap member 6**.

Damper members 7 are provided inside the speaker 1. Each damper member 7 is made of an elastically deformable sheet material and has a cross section formed with a corrugated shape. Two damper members 7 are provided parallel to each other in the front-rear direction. An outer peripheral portion **7*a* of each damper member 7 is adhered and fixed to the rear frame 12, and an inner peripheral portion 7*b* of each damper member 7 is adhered and fixed to the outer peripheral surface of the bobbin 5. In the vibration part 2, the diaphragm 3, the bobbin 5, and the cap member 6 are supported by the edge member 4, which is a part of the vibration part 2, and the damper members 7** so as to vibrate freely in the front-rear direction.

As shown in FIG. 3, a voice coil 8 is wound around an outer periphery of a front (Y1 direction) end portion of the bobbin 5. The voice coil 8 is also a part of the vibration part 2. The voice coil 8 and a magnetic circuit part 20 constitute a magnetic driving part. The magnetic circuit part 20 has a front yoke 21, a center pole 22, and a rear yoke 24. The front yoke 21, the center pole 22, and the rear yoke 24 are made of a magnetic material. A ring-shaped magnet 23 is interposed between the front yoke 21 and the rear yoke 24. A magnetic gap is formed at a facing portion where an outer peripheral surface of the center pole 22 and an inner peripheral surface of the rear yoke 24 face each other, and the voice coil 8 is positioned in the magnetic gap. Due to a magnetic field that is produced from the magnet 23, a magnetic flux that passes inside the magnetic gap crosses the voice coil 8.

As shown in FIGS. 1 and 2, the cover member 13 is such that its ring-shaped region formed around the central axis O is a cover tapering portion 13*a*. As shown in FIG. 3, the cover tapering portion 13*a* is inclined in the same direction as the tapering portion of the diaphragm 3, and the tapering portion of the diaphragm 3 and the cover tapering portion 13*a* face each other substantially in parallel to each other. The cover member 13 is such that a region of its central portion surrounded by the cover tapering portion 13*a* is a protruding portion 13*b* that protrudes rearward. A recessed portion 13*c* that is recessed rearward (Y2 direction) in a direction away from the vibration part 2 is formed at a forwardly (Y1 direction) facing inner surface of the cover member 13. The recessed portion 13*c* is formed along an arc locus formed around the central axis O at an outer periphery of the cover tapering portion 13*a*.

As shown in FIG. 3, a space 15 is formed between the vibration part 2 and the cover member 13. At the vibration part 2, the edge member 4 is provided around an outer periphery of the diaphragm 3, and the cap member 6 that covers the opening of the bobbin 5 is provided at a central portion of the diaphragm 3. Therefore, the space 15 provided rearward (Y2 direction) of the vibration part 2 is provided apart from a space provided forward (Y1 direction) of the vibration part 2. The inside space of the duct 14 communicates with the space 15, and the space 15 is provided apart from outside space excluding the inside space of the duct 14.

As shown in FIG. 3, inside the space 15, at a region where the recessed portion 13*c* is formed, an interval (interval in the vibration direction of the vibration part 2) L1 in the front-rear direction between a rearwardly (Y2 direction) facing rear surface of the vibration part 2 and a forwardly (Y1 direction) facing front surface of the cover member 13 is wider than an interval in the front-rear direction at the other part in the space 15. In the embodiment shown in FIG. 3, the other part is a facing portion where the tapering portion of the diaphragm 3 and the cover tapering portion 13*a* face each other. The interval L1 in the front-rear direction at a portion where the recessed portion 13*c* is formed is wider than an interval (interval in the vibration direction of the vibration part 2) L2 in the front-rear direction at the facing portion.

In the space 15 between the vibration part 2 and the cover member 13, the region having the interval L1 and formed along an arc locus formed around the central axis O is an air flow path 16. In the present specification, an inside space of the recessed portion 13*c* of the cover member 13 alone can be defined as the air flow path 16. This is the definition of the air flow path in a narrow sense. The inside space of the recessed portion 13*c*, an inside space of the edge member 4 having a semicircular shape in cross section, and the space interposed between the recessed portion 13*c* and the edge member 4 from the front and rear (space having the interval L1) can be defined in their entirety as the air flow path 16. This is the definition of the air flow path in a wide sense. Alternatively, a region in which the inside space of the edge member 4 is removed from the region having the interval L1 can be defined as the air flow path 16. In a structure in which the cover member 13 does not have a recessed portion 13*c*, a region in which the inside space of the recessed portion 13*c* is removed from the region having the interval L1, that is, the inside space of the edge member 4 and a space that is formed continuously with a rear side of the inside space of the edge member 4 function as the air flow path 16.

As shown in FIGS. 1 and 3, at a region having a constant radius from the central axis O, the air flow path 16 extends along an arc locus formed around the central axis O. The air flow path 16 communicates with the inside space of the duct 14. By forming the air flow path 16 along the arc locus having a constant radius from the central axis O as the center, when the vibration part 2 vibrates back and forth, the viscous resistance of air that occurs due to the space 15 can evenly act upon the vibration part 2.

As shown in FIG. 2, an opening 18 is formed in the cover member 13 in the region where the recessed portion 13*c* is formed and at a position near the duct 14. In the region where the opening 18 is formed, a circuit part 30 is mounted on a rearwardly facing outer surface of the cover member 13. The circuit part 30 has a circuit board 31, and electronic elements (electronic components) 32 are mounted on a rearwardly facing surface of the circuit board 31. The circuit part 30 constitutes an amplifier, and a heating electronic element (heating electronic component) is included among the electronic elements 32. The outer surface of the cover member 13, where the circuit part 30 is mounted, is a flat surface, and the circuit part 30 can be stably mounted.

As shown in FIG. 3, in an inside space situated forward of the recessed portion 13*c*, at least a part of a heat sink 33 is provided at a portion where the opening 18 is formed. The heat sink 33 is made of a metallic material having a high thermal conductivity, such as aluminum or an aluminum alloy. A heat-conducting part that contacts the heating electronic element is formed from, for example, a metallic layer and on a forwardly (Y1 direction) facing surface of the circuit board 31. The heat sink 33 is connected to the heat-conducting part, and the heat sink 33 and the circuit part 30 are connected to each other to allow thermal conduction via the inside of the opening 18. As shown in FIGS. 2 and 3, a plurality of grooves 33*a* are formed in the heat sink 33 so as to extend therethrough in a direction intersecting the front-rear directions (Y1-Y2 directions). Inside the recessed portion 13*c*, the grooves 33*a* extend through the heat sink 33 in a direction of flow of air in the air flow path 16, that is, in a direction toward the duct 14.

Next, an operation of the speaker 1 is described.

In a sound-producing operation, a drive current is applied to the voice coil 8 based on an audio signal that has been output from an audio amplifier. At the magnetic circuit part 20, a drive magnetic flux circulates based on a magnetic field of the magnet 23, and the drive magnetic flux crosses the voice coil 8 that is positioned in the magnetic gap. By an electromagnetic force that is excited by the drive magnetic flux that crosses the magnetic gap and the drive current of the voice coil 8, the vibration part 2 including the diaphragm 3, the edge member 4, the bobbin 5, and the cap member 6 vibrates in the front-rear direction. Due to primarily the vibration of the diaphragm 3 in the front-rear direction, sound pressure that is produced forward (Y1 direction) of the diaphragm 3 passes through the opening 11*a* of the front frame 11 and is applied to the inside of a compartment of a vehicle. Although air pressure having a phase that is opposite to that of the sound pressure is produced rearward (Y2 direction) of the diaphragm 3, the air pressure is discharged to the outside via the inside space of the duct 14 from the space 15 between the vibration part 2 and the cover member 13. Therefore, the sound pressure that is produced in the forward direction (Y1 direction) and the air pressure having a phase that is opposite to that of the sound pressure are suppressed from interfering with each other.

In the space 15 between the vibration part 2 and the cover member 13, based on the vibration of the vibration part 2 in the front-rear direction, the air pressure changes and an airflow is produced due to the change in the air pressure. In the space 15, the front-rear interval L2 at the facing portion where the tapering portion of the diaphragm 3 and the cover tapering portion 13*a* face each other is narrow, and the front-rear interval L1 at the air flow path 16 is wide. Therefore, due to a pressure change in a space having the interval L2 and provided between the tapering portions, the airflow easily concentrates at the air flow path 16 having the interval L1.

When the vibration part 2 moves rearward (Y2 direction), air that is compressed in the space having the narrow interval L2 and formed between the tapering portions flows into the air flow path 16, an airflow is produced in the air flow path 16, and the airflow is discharged to outside space from the duct 14. When the vibration part 2 moves forward (Y1 direction), since the volume of the space having the interval L2 and formed between the tapering portions increases and the air pressure is reduced, air in outside space flows into the space having the interval L2 and formed between the tapering portions from the air flow path 16 via the inside of the duct 14. Therefore, inside the space 15, the airflow along the air flow path 16 inside the recessed portion 13*c* formed along an arc locus is easily produced, and the heat sink 33 that is positioned in the air flow path 16 is easily exposed to the airflow. Heat produced at the circuit part 30 is discharged into outside space situated rearward of the cover member 13, and is transmitted to the airflow in the air flow path 16 via the heat sink 33 and is discharged to outside space via the inside space of the duct 14. Inside the air flow path 16, since the grooves 33*a* of the heat sink 33 extend in the direction of flow of air in the air flow path 16, the effect of dissipating heat into the air flow path 16 from the heat sink 33 can be increased.

As shown in FIG. 2, the cover member 13 is such that its recessed portion 13*c* is formed continuously with the cover tapering portion 13*a*, that is, the air flow path 16 that is formed continuously with a space situated forward of the cover tapering portion 13*a* is formed. The air flow path 16 is formed along an arc locus formed around the central axis O, and communicates with the inside of the duct 14 that is situated at an outer peripheral position displaced from the central axis O. In this structure, a flow easily concentrates in the air flow path 16 formed along the arc locus due to a pressure change in the space between the tapering portions, and the airflow moves to outside space via the inside space of the duct 14 that is positioned at an outer peripheral region. Since at least a part of the heat sink 33 is positioned in the air flow path 16 and near the duct 14, heat is easily dissipated from the heat sink 33.

In the second embodiment to the fourth embodiment, parts having the same functions as those of the first embodiment shown in FIGS. 1 to 3 are, even if they differ in, for example, their shapes, given the same reference numerals and are not described in detail below.

Second Embodiment

Figure 4:
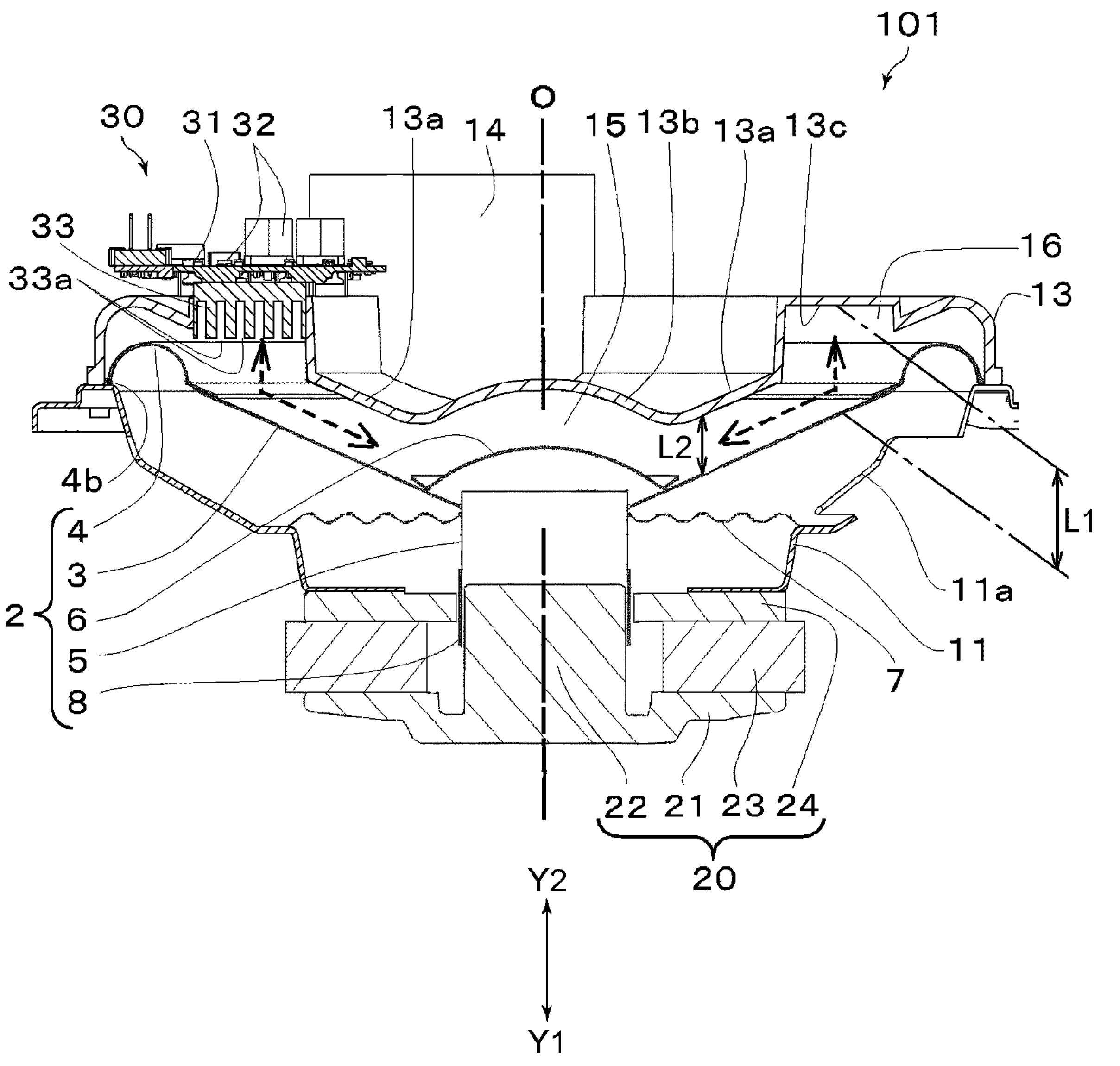
FIG. 4 is a sectional view showing a speaker of a second embodiment of the present invention.

In a speaker 101 of the second embodiment shown in FIG. 4, a supporting body 10 includes a front frame 11 and a cover member 13, and does not include a rear frame 12. An outer peripheral portion 4*b* of an edge member 4 that constitutes a vibration part 2 is fixed by being interposed between an outer peripheral portion of the front frame 11 and an outer peripheral portion of the cover member 13. A diaphragm 3 that constitutes the vibration part 2 has a tapering portion whose diameter gradually increases rearward (Y2 direction), and an inclination direction of the tapering portion of the diaphragm 3 is opposite to that in the first embodiment in a front-rear direction. A damper member 7 is positioned forward (Y1 direction) of the diaphragm 3. A cap member 6 that covers an opening situated rearward of a bobbin 5 has a dome shape whose protruding side faces rearward.

The cover member 13 has a dome-shaped protruding portion 13*b* formed at a central portion thereof, and protruding so as to match a rearward bulge of the cap member 6. The cover member 13 has a cover tapering portion 13*a* that is formed continuously with an outer periphery of the protruding portion 13*b* and that tapers with respect to a central axis O as a center. The inclination direction of the cover tapering portion 13*a* is the same as the inclination direction of the tapering portion of the diaphragm 3. A recessed portion 13*c* recessed rearward on an outer peripheral side of the cover tapering portion 13*a* is formed in a forwardly facing inner surface of the cover member 13. Similar to the first embodiment, the recessed portion 13*c* is formed continuously over substantially the entire periphery along an arc locus formed around the central axis O. A duct 14 is formed at the cover member 13 so as to be displaced from the central axis O, and the inside of the recessed portion 13*c* communicates with an inside space of the duct 14.

As shown in FIG. 4, in the speaker 101, the recessed portion 13*c* of the cover member 13 is formed toward an inner peripheral side closer to the central axis O than a facing portion where the cover member 13 and the edge member 4 face each other, and, in a space 15, a region where the recessed portion 13*c* and the diaphragm 3 face each other is an air flow path 16. An interval of the air flow path 16 in a front-rear direction is L1. At a location closer to a central side than the recessed portion 13*c*, an interval L2 in the front-rear direction at a facing portion where a tapering portion of the diaphragm 3 and the cover tapering portion 13*a* face each other is narrow, and an interval in the front-rear direction at a facing portion where the cap member 6 and the dome-shaped protruding portion 13*b* face each other is substantially L2. Therefore, the interval L1 of the air flow path 16 in the front-rear direction is wider than the intervals at these regions in the space 15.

A heat sink 33 is provided near the duct 14 inside the air flow path 16, and a circuit part 30 mounted on an outer surface of the cover member 13 is connected to the heat sink 33 to allow heat conduction.

In the space 15 at a facing portion where the vibration part 2 and the cover member 13 face each other at the speaker 101 of the second embodiment, the interval L1 of the air flow path 16 in the front-rear direction is wide, and the interval L2 in the front-rear direction of the space 15 in the entire region situated inward of the air flow path 16 is narrow. Therefore, when the vibration part 2 vibrates back and forth, a pressure change at a portion, where the interval L2 is narrow, of a central portion where the cover tapering portion 13*a* and the protruding portion 13*b* are formed is increased, as a result of which an airflow having a high flow speed is formed from the air flow path 16 to the inside space of the duct 14. Therefore, the effect of dissipating heat from the heat sink 33 can be increased.

Third Embodiment

Figure 5:
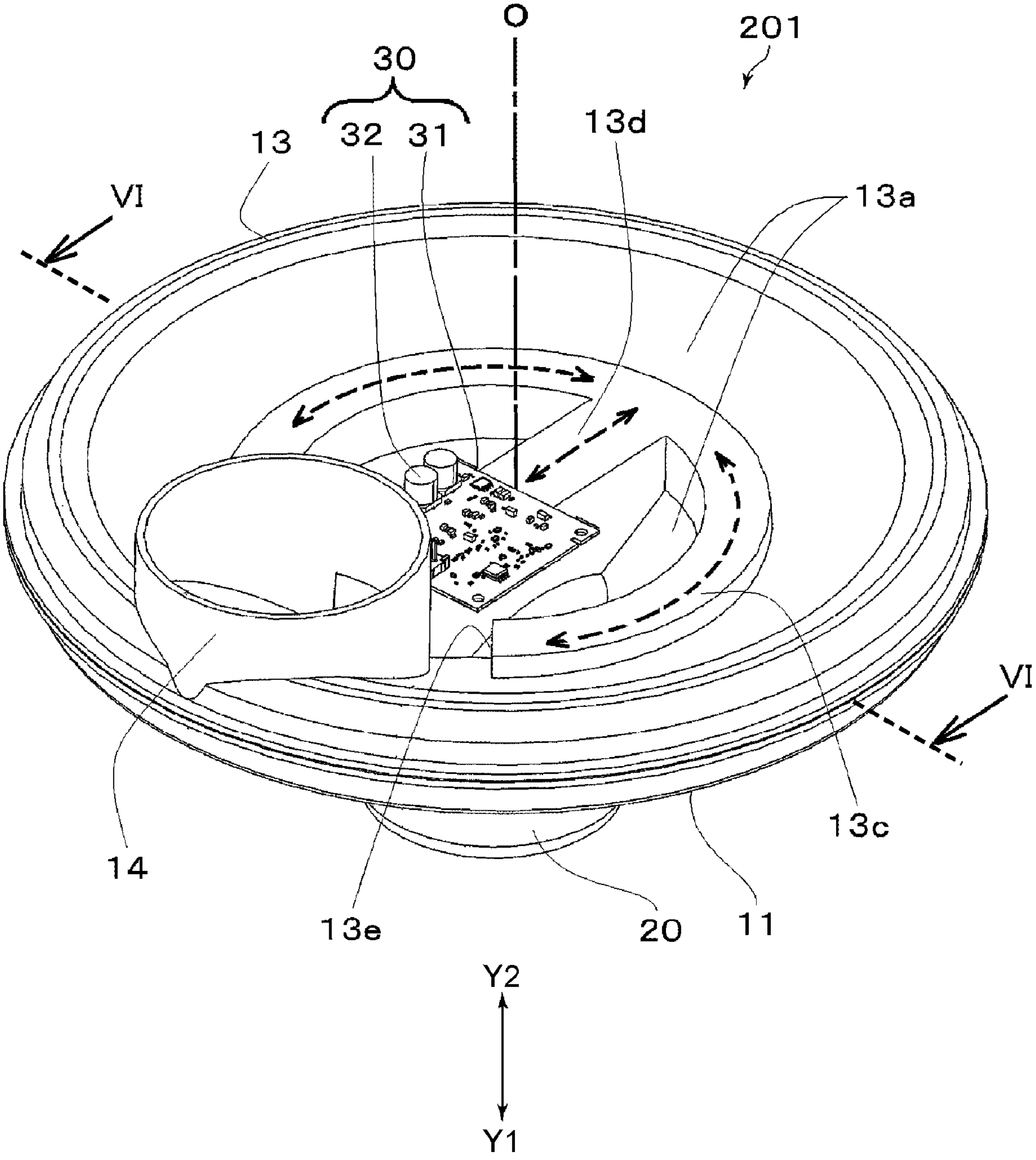
FIG. 5 is an exterior perspective view showing a speaker of a third embodiment of the present invention as seen from the rear.
Figure 6:
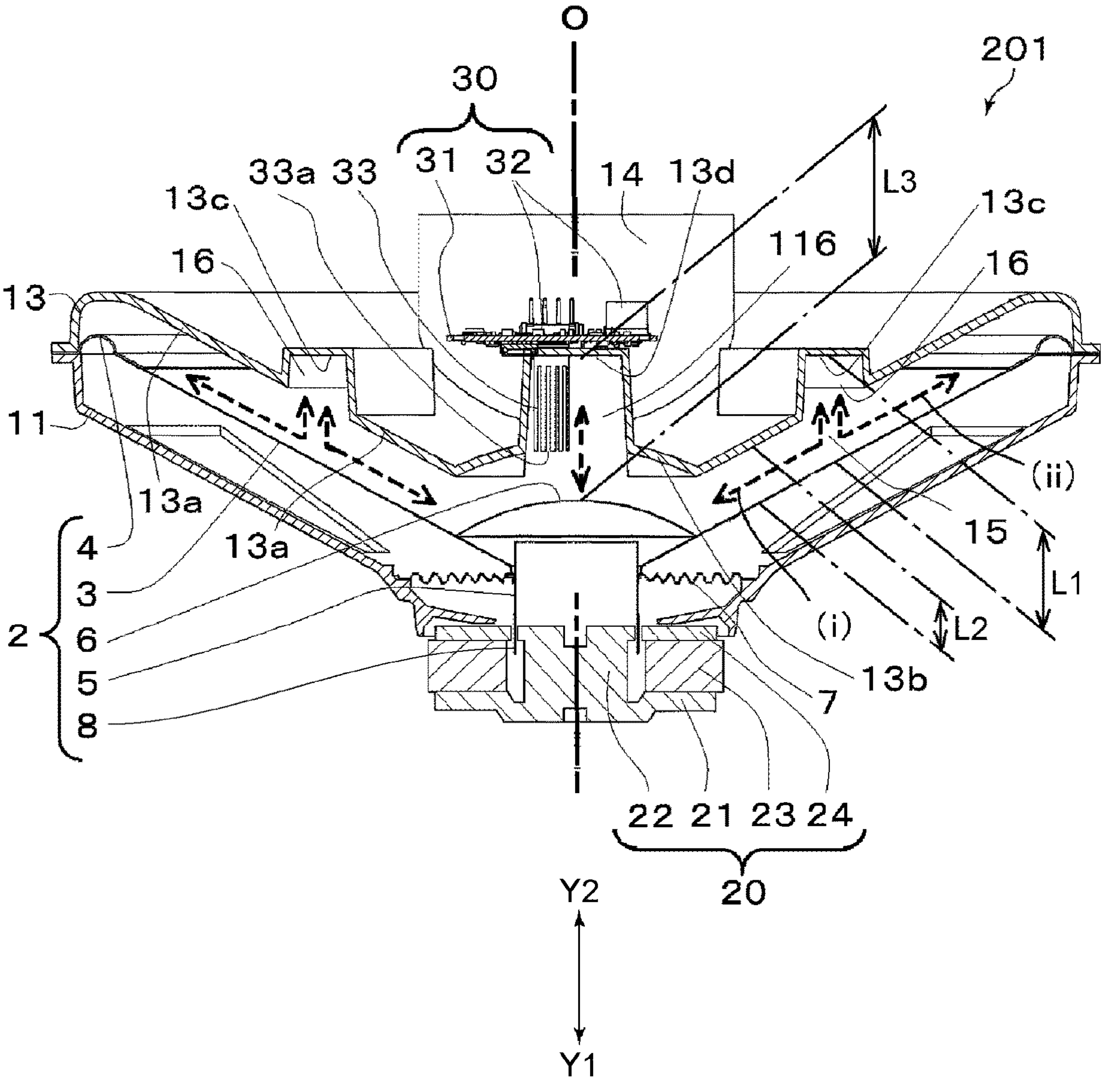
FIG. 6 is a sectional view of the speaker of the third embodiment along line VI-VI shown in FIG. 5.

The basic speaker structure of a speaker 201 of a third embodiment shown in FIGS. 5 and 6 is the same as that of the speaker 101 of the second embodiment shown in FIG. 4. A cover member 13 has a cover tapering portion 13*a* whose diameter gradually increases rearward, and the cover tapering portion 13*a* and a tapering portion of a diaphragm 3 face each other substantially in parallel to each other. In the cover member 13, a recessed portion 13c is formed at a location closer than an edge member 4 to a central axis O, that is, at a location on the cover tapering portion 13a in a radial direction, and a central recessed portion 13d is further formed at a central portion. As shown in FIG. 5, the recessed portion 13c is formed along an arc locus formed around the central axis O, and the central recessed portion 13d extends on the central axis O and linearly in a diameter direction. A duct 14 is displaced from the central axis O. In the cover member 13, a protruding portion 13b is formed at a boundary portion between the cover tapering portion 13a and the central recessed portion 13d, and has a dome shape rounded rearward so as to match the shape of a cap member 6.

As shown in FIG. 5, a closed end portion 13e of the recessed portion 13c formed along the arc locus is disposed away from the duct 14, and the recessed portion 13c does not directly communicate with the duct 14. On a side opposite to where the duct 14 is provided with the central axis O in between, a midway portion of the arc-shaped recessed portion 13c and the central recessed portion 13d communicate with each other. The central recessed portion 13d communicates with an inside space of the duct 14.

As shown in FIG. 6, in a space 15 between a vibration part 2 and the cover member 13, a facing interval L1 in a front-rear direction between the recessed portion 13c and the diaphragm 3 is wide, and a region where the recessed portion 13c and the diaphragm 3 face each other is an air flow path 16. An inside space of the recessed portion 13c alone can be defined as the air flow path 16. An interval L2 in the front-rear direction at a region that the cover tapering portion 13a, which is the other part in the space 15, faces is narrower than the interval L1, and the distance in the front-rear direction at a region that the protruding portion 13b faces is also equal to the interval L2. An interval L3 in the front-rear direction between the central recessed portion 13d and the cap member 6, which is a part of the vibration part 2, is also wide, and a region where the central recessed portion 13d and the cap member 6 face each other is a central air flow path 116. An inside space of the central recessed portion 13d alone can be defined as the central air flow path 116. In the space 15, the relationship between the intervals in the front-rear direction is L2<L1<L3.

A heat sink 33 is provided near the duct 14 inside the central air flow path 116, and a circuit part 30 mounted on an outer surface of the cover member 13 is connected to the heat sink 33 to allow heat conduction.

Even in the speaker 201 of the third embodiment, when the vibration part 2 vibrates back and forth, in the space 15 between the vibration part 2 and the cover member 13, a pressure change at a portion where the cover tapering portion 13a and the protruding portion 13b are formed and where the interval L2 is narrow is increased, as a result of which an airflow concentrates inside the air flow path 16 and inside the central air flow path 116, where the intervals in the front-rear direction are wide. As shown in FIG. 6, on an outer peripheral side of the recessed portion 13c, due to an airflow (ii) that is produced by a pressure change at a location between the tapering portion of the diaphragm 3 and the cover tapering portion 13a, primarily, an airflow in the air flow path 16 extending along a circumferential locus is accelerated. On an inner peripheral side of the recessed portion 13c, due to an airflow (i) that is produced by a pressure change at a location between the tapering portion of the diaphragm 3 and the cover tapering portion 13a, an airflow in the air flow path 16 and the central air flow path 116, each extending along a circumferential locus, is accelerated.

Further, the airflow in the air flow path 16 that does not directly communicate with the duct 14 and that is formed along the arc locus accelerates the airflow in the central air flow path 116, and the airflow having a relatively high speed in the central air flow path 116 increases the effect of dissipating heat from the heat sink 33.

Fourth Embodiment

Figure 7:
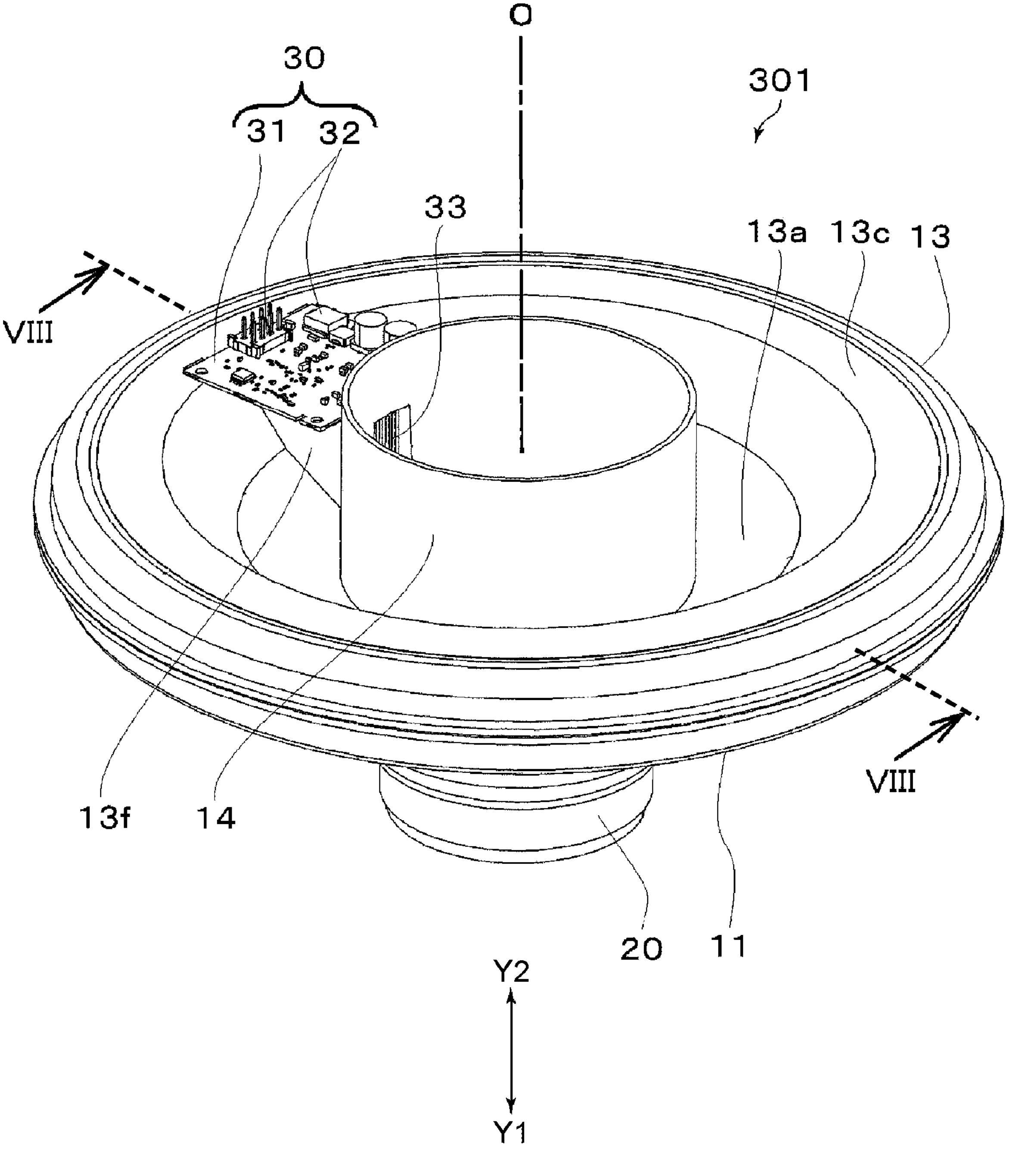
FIG. 7 is an exterior perspective view showing a speaker of a fourth embodiment of the present invention as seen from the rear.
Figure 8:
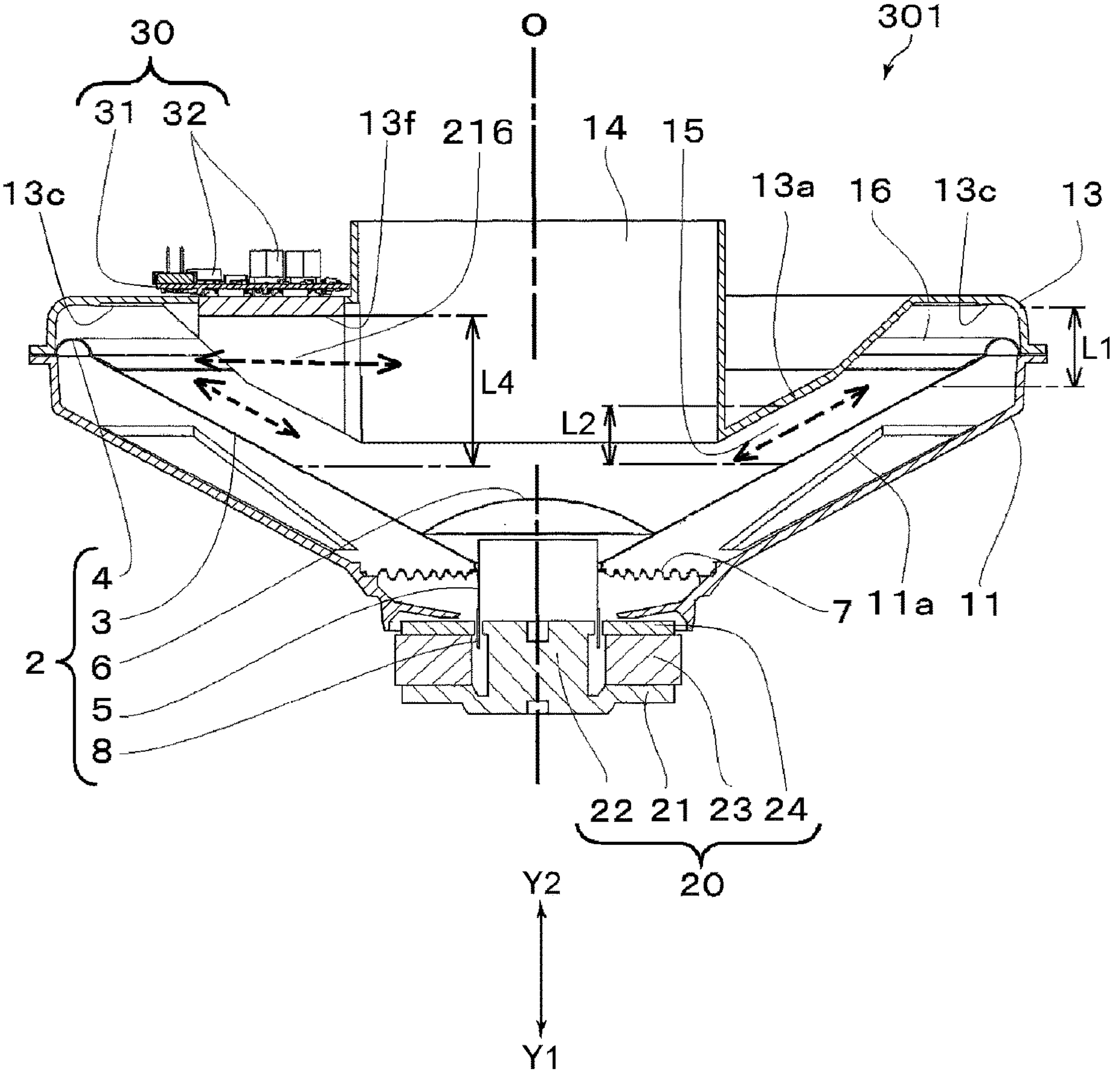
FIG. 8 is a sectional view of the speaker of the fourth embodiment along line VIII-VIII shown in FIG. 7.

The basic speaker structure of a speaker 301 of a fourth embodiment shown in FIGS. 7 and 8 is the same as that of the speaker 201 of the third embodiment shown in FIGS. 5 and 6. A cover member 13 of the speaker 301 of the fourth embodiment has a recessed portion 13c along an arc locus and around an outer peripheral portion of a cover tapering portion 13a. A duct 14 has a central portion including a central axis O of the cover member 13. A linear recessed portion 13f is formed between the recessed portion 13c and the duct 14.

In a space 15 between a vibration part 2 and the cover member 13, at a region of an outer peripheral portion where the recessed portion 13c is formed, an interval L1 between the vibration part 2 and the cover member 13 in a front-rear direction is wide, and an inside space of the recessed portion 13c or a space where the recessed portion 13c and the vibration part 2 face each other is an air flow path 16 along an arc locus. At a region where the linear recessed portion 13f is formed, an interval L4 between a diaphragm 3 and the cover member 13 in the front-rear direction is wide, and an inside space of the linear recessed portion 13f or a space at a facing portion where the linear recessed portion 13f and the diaphragm 3 face each other is a linear air flow path 216. The linear air flow path 216 extends toward a central portion from an outer peripheral side. The relationship between the intervals L1 and L4 and an interval L2 in the front-rear direction at a region where the cover tapering portion 13a is provided is L2<L1<L4.

In the speaker 301 of the fourth embodiment, when the vibration part 2 vibrates back and forth, in the space 15 between the vibration part 2 and the cover member 13, a pressure change at a portion where the cover tapering portion 13a and a protruding portion 13b are formed and where the interval L2 is narrow is increased, as a result of which the speeds of airflows inside the air flow path 16 and the linear air flow path 216, each of whose interval in the front-rear direction is wide, are increased. In addition, the airflow in the air flow path 16 along the arc locus accelerates the airflow in the linear air flow path 216, as a result of which air enters and exits between the space 15 and outside space via an inside space of the duct 14.

Since a circuit part 30 is mounted on an outer side of the linear recessed portion 13f and a heat sink 33 is provided at the linear air flow path 216, the effect of dissipating heat from the heat sink 33 by the airflow in the linear air flow path 216 is increased.

The speakers of the first embodiment to the fourth embodiment of the present invention can also be used with the Y2 direction being a sound-producing direction. For example, the speaker is disposed in a space outside a compartment of a vehicle, such as an engine compartment or a trunk, and is fixed to the body of a vehicle. Here, the Y2 direction of the speaker is directed toward the inside of the compartment of the vehicle, and the duct 14 communicates with a space inside the compartment of the vehicle. When the diaphragm 3 of the speaker vibrates in the Y1-Y2 directions, sound pressure that is produced on a Y2 side of the diaphragm 3 is applied to the inside of the compartment of the vehicle via the inside space of the duct 14 from the space 15 between the vibration part 2 and the cover member 13. Even in this mode of use, the effect of dissipating heat of the circuit part 30 by the flow of air in the air flow path can be increased.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A speaker comprising:
- a vibration part that includes a diaphragm and a voice coil;
- a magnetic circuit part that applies a magnetic field to the voice coil; and
- a supporting body that supports the vibration part and the magnetic circuit part,
- wherein the supporting body includes a cover member that covers the vibration part from one of vibration directions of the vibration part, and a duct that causes a space between the vibration part and the cover member to communicate with outside space situated outward of the cover member,
- wherein an air flow path is formed at an interval between the vibration part and the cover member in the vibration directions that is wider than an interval at another location in the space between the vibration part and the cover member, and the air flow path communicates with an inside of the duct, and
- wherein a circuit part provided on an outer side of the cover member and a heat sink are connected to each other, and at least a part of the heat sink is exposed in the air flow path formed in the wider interval to allow heat conduction.

2. The speaker according to claim 1, wherein the cover member is such that a part of a region thereof that covers the vibration part has a recessed portion recessed in a direction away from the vibration part, and an inside of the recessed portion functions as the air flow path.

3. The speaker according to claim 1, wherein the air flow path is formed continuously around a central axis of the vibration part, and the duct is displaced from the central axis.

4. The speaker according to claim 1, wherein the duct is displaced from a central axis of the vibration part, and at least a part of the air flow path passes through the central axis.

5. The speaker according to claim 1, wherein the duct is provided on a central axis of the vibration part, and the air flow path extends toward the central axis from an outer peripheral side of the vibration part.

6. The speaker according to claim 1, wherein the diaphragm has a tapering portion, and the cover member includes a cover tapering portion that faces the tapering portion of the diaphragm and that is inclined in a same direction as the tapering portion of the diaphragm, and
- wherein the interval at the air flow path in the vibration directions is wider than an interval between the vibration part and the cover tapering portion in the vibration directions.

7. The speaker according to claim 1, wherein the heat sink has a groove, and
- wherein the groove extends through the heat sink in a direction toward the duct in the air flow path.

8. The speaker according to claim 1, wherein the circuit part has a circuit board fixed to an outer surface of the cover member and an electronic element mounted on the circuit board, and
- wherein the heat sink is connected to the circuit part via an opening in the cover member.

9. A speaker comprising:
- a vibration part that includes a diaphragm and a voice coil;
- a magnetic circuit part that applies a magnetic field to the voice coil; and
- a supporting body that supports the vibration part and the magnetic circuit part,
- wherein the supporting body includes a cover member that covers the vibration part from one of vibration directions of the vibration part, and a duct that causes a space between the vibration part and the cover member to communicate with outside space situated outward of the cover member,
- wherein at least a part of the cover member has a recessed portion recessed in a direction away from the vibration part, and an interval between the vibration part and the recessed portion in the vibration directions is wider than an interval at another location in the space between the vibration part and the cover member,
- wherein an air flow path is formed in an inside of the recessed portion, and the air flow path communicates with an inside of the duct, and
- wherein a circuit part provided on an outer side of the cover member and a heat sink are connected to each other, and at least a part of the heat sink is exposed in the air flow path formed in the recessed portion to allow heat conduction.

10. The speaker according to claim 9, wherein the air flow path is formed continuously around a central axis of the vibration part, and the duct is displaced from the central axis.

11. The speaker according to claim 9, wherein the duct is displaced from a central axis of the vibration part, and at least a part of the air flow path passes through the central axis.

12. The speaker according to claim 9, wherein the duct is provided on a central axis of the vibration part, and the air flow path extends toward the central axis from an outer peripheral side of the vibration part.

13. The speaker according to claim 9, wherein the diaphragm has a tapering portion, and the cover member includes a cover tapering portion that faces the tapering portion of the diaphragm and that is inclined in a same direction as the tapering portion of the diaphragm, and
- wherein the interval at the air flow path in the vibration directions is wider than an interval between the vibration part and the cover tapering portion in the vibration directions.

14. The speaker according to claim 9, wherein the heat sink has a groove, and
- wherein the groove extends through the heat sink in a direction toward the duct in the air flow path.

15. The speaker according to claim 9, wherein the circuit part has a circuit board fixed to an outer surface of the cover member and an electronic element mounted on the circuit board, and wherein the heat sink is connected to the circuit part via an opening in the cover member.

* * * * *